J. D. ISAACS.
HELICALLY CORRUGATED PIPE LINE.
APPLICATION FILED AUG. 5, 1907.
No. 898,741.
Patented Sept. 15, 1908.
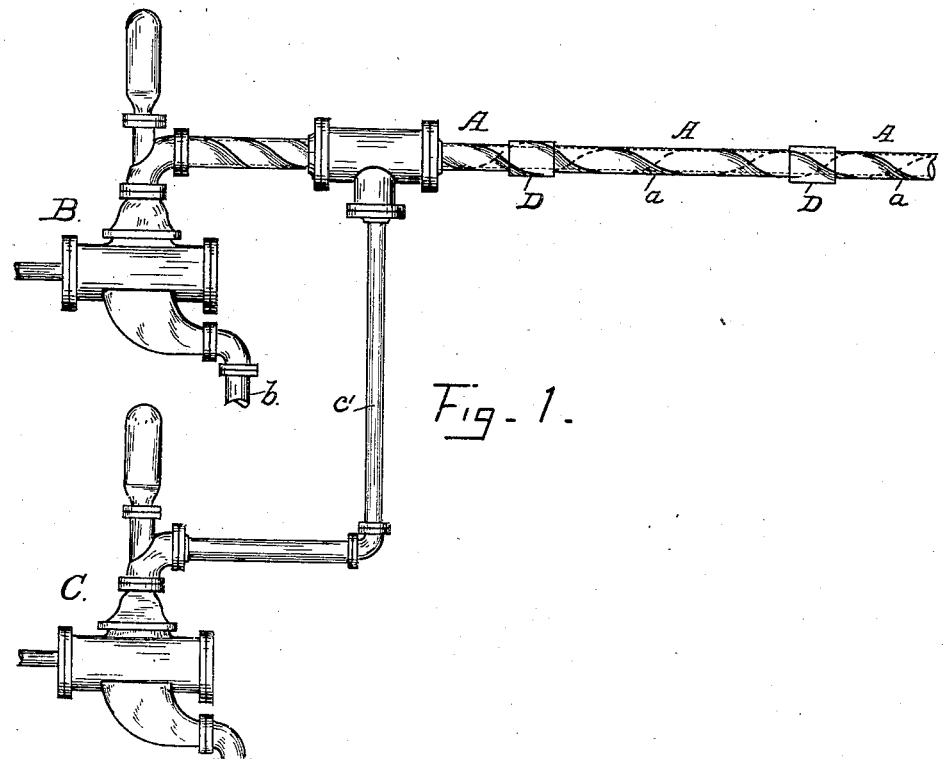
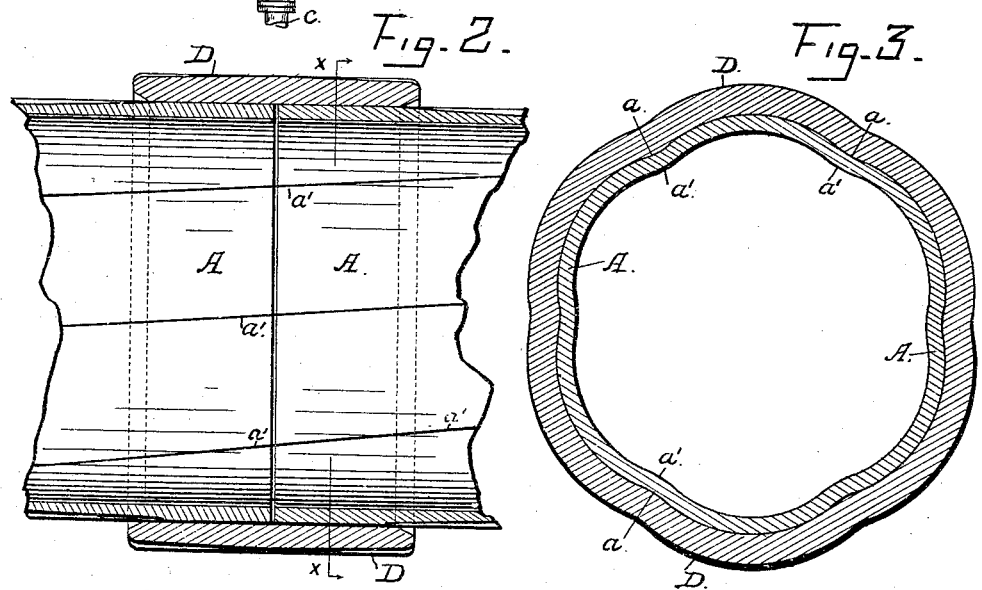
WITNESSES
INVENTOR
John Dove Isaacs
BY Wm. F. Booth
ATTORNEY

UNITED STATES PATENT OFFICE.

JOHN DOVE ISAACS, OF CHICAGO, ILLINOIS, ASSIGNOR TO RIFLED PIPE COMPANY, OF SAN FRANCISCO, CALIFORNIA, A CORPORATION OF CALIFORNIA.

HELICALLY-CORRUGATED PIPE-LINE.

No. 898,741.          Specification of Letters Patent.         Patented Sept. 15, 1908.

Application filed August 5, 1907. Serial No. 387,061.

To all whom it may concern:

Be it known that I, JOHN DOVE ISAACS, a citizen of the United States, residing at Chicago, in the county of Cook and State of Illinois, have invented certain new and useful Improvements in Helically-Corrugated Pipe-Lines, of which the following is a specification.

My invention relates to a pipe-line, especially adapted for conveying a fluid, such as crude-petroleum, by advancing it, together with a fluid of greater specific gravity, such as water, through the pipe with a helical motion of said fluids about the axis of the pipe-content, whereby the heavier fluid is caused to move outwardly and form an envelop about the oil, to decrease the friction against the pipe walls, in accordance with that method disclosed in United States Letters Patent, No. 759,374, granted May 10, 1904.

The helical motion of the pipe-content, is, in practice, caused by an internal helically directed rib in the pipe-line, and experience has shown that this rib is best formed by indenting the exterior of the pipe, thereby forming a corresponding elevation on its interior, as is disclosed by an application for patent, Serial Number 266,576, filed June 23, 1905, which said application is about to eventuate in a patent; and as is further disclosed in a machine for thus preparing the pipe, which machine is covered by United States Letters Patent No 803,232, dated October 31, 1905.

To connect the ends of the pipe sections which form the line, it has been customary to stop the corrugations at a point near each end, leaving said ends circular in section; the exterior surface of the ends being screw-threaded, and the coupling made by a screw-sleeve on the adjacent ends of the sections. This custom presents a twofold disadvantage, in that it necessitates a certain length of the pipe sections at the ends being left circular in section, to allow for the cutting of the screw-threads, which tends somewhat to interfere with the centrifugal action of the helically directed interior corrugation, by destroying its continuity, and it also prevents the lineal adjustment of the terminals of said corrugations to make them continuous, one with the other, in position. In the use of this helically corrugated, indented, or as it may also be termed, "rifled" pipe, it is of advantage, in order to obtain an even flow of the pipe-line-content, that the adjacent ends of the consecutive lengths of pipe be so placed with respect to each other that the corrugations or riflings may come in line with each other, and also that the channels so formed shall be continuous, by extending the corrugations to the very ends of the pipe sections.

To obtain these advantages is the object of my present invention, which, to this end, consists in the novel construction of the pipe-line, which I shall now fully describe, by reference to the accompanying drawings in which Figure 1 is a side elevation of a pipe-line embodying my present invention. Fig. 2 is a longitudinal section, enlarged and broken, showing the connection between sections of pipe. Fig. 3 is a cross section through said connection.

The pipe-line A is composed of sections of pipe of suitable length, coupled together. Each of these pipe sections is helically corrugated; in practice, by means of pressure applied exteriorly, so that the outer surface is indented, as seen at $a$, while the inner surface is correspondingly elevated, as shown at $a'$. In my present improvement, this helical corrugation is carried clear to the ends of the pipe sections, so that when said sections are brought together in proper relation, the corrugations will register, and the interior channels formed by them will be continuous, as shown in Fig. 2, thereby providing for an even and uninterrupted flow of the pipe-content. In order to enable the pipe sections to be thus relatively registered and to rigidly hold them in this position, they are coupled together by a sleeve D, which on its interior surface is helically corrugated, as shown, to the same shape and depth of thread and at the same pitch as the corrugations on the exterior of the pipe sections. In practice, the exterior of the sleeve may be correspondingly helically indented, this being merely a constructive expedient and not essential. The sleeve D, thus formed, is forced upon the end of one of the sections of pipe by hydraulic or other pressure, and the end of the adjacent section of pipe is by similar means forced into the sleeve. If necessary the joint may be insured against leakage by calking, brazing, welding or other usual means. The objects sought are thus obtained, for the two pipe sections may be firmly fixed in proper relative positions with respect to their interior corrugations.

It is not primarily essential that the sleeve D be made to initially fit tightly on the pipe. It may be larger, and the space thus left may be caulked, say with copper or lead, or other substance, in which event the same result would be reached, for the corrugations in the sleeve will still prevent, through the intermediation of the calking, the pipe from turning or changing its position relatively to the adjacent section.

In Fig. 1, B represents a pump by which the lighter fluid, such as the oil, coming from the oil supply pipe $b$, is forced into the pipe line; and C represents a pump, by which the heavier fluid, such as the water, from the supply pipe $c$, is forced into the pipe-line through the connection $c'$.

Having thus described my invention, what I claim as new and desire to secure by Letters Patent is,

1. In a pipe-line for the method stated, the combination of pipe sections, each section, throughout its entire length, being helically corrugated by corresponding exterior indentations and interior elevations, and a coupling sleeve encircling the adjacent ends of the pipe sections, said sleeve being interiorly corrugated to correspond with the exterior corrugations of the pipe sections, substantially as and for the purpose described.

2. In an apparatus for the method stated, and in combination with means for supplying the lighter and heavier fluids to a pipe-line, the pipe-line comprising pipe sections, each section, throughout its entire length, being helically corrugated by corresponding exterior indentations and interior elevations, and a coupling sleeve encircling the adjacent ends of the pipe sections, said sleeve being interiorly corrugated to correspond with the exterior corrugations of the pipe sections, substantially as and for the purpose described.

3. In a pipe line, for the method stated, the combination of a plurality of abutting pipe sections, a coupling member fitting over the respective sections at their adjoining ends, each pipe section being helically corrugated by exterior indentations and interior elevations and the coupling member being interiorly corrugated to correspond with the exterior corrugations of the pipe sections, through the medium of which complementary corrugations the sections are held together, the terminals of the corrugations on the respective sections constituting continuations one of the other, and the interior wall of the respective sections being otherwise free from perturbances.

In testimony whereof I have signed my name to this specification in the presence of two subscribing witnesses.

JOHN DOVE ISAACS.

Witnesses:
　R. B. BURTON,
　E. E. ADAMS.